(12) United States Patent
Chang

(10) Patent No.: US 6,390,855 B1
(45) Date of Patent: May 21, 2002

(54) EXPANSION SLOT ADAPTER FOR A PALM HELD COMPUTER

(75) Inventor: Jessica Chang, Taipei (TW)

(73) Assignee: Jess-Link Products Co., Ltd., Taipei (TW)

( * ) Notice: Subject to any disclaimer, the term of this patent is extended or adjusted under 35 U.S.C. 154(b) by 0 days.

(21) Appl. No.: 09/737,571

(22) Filed: Dec. 18, 2000

(30) Foreign Application Priority Data

Dec. 1, 2000 (TW) ........................................ 089220902

(51) Int. Cl.[7] ........................ H01R 13/64; H01R 24/00; H01R 25/00; H01R 27/02; H01R 31/00
(52) U.S. Cl. ........................ 439/638; 439/630; 439/680
(58) Field of Search ................................ 439/638, 630, 439/945, 680, 218, 64, 541.5, 159, 160; 361/737, 753; 206/706, 716, 711, 712; 211/41.17

(56) References Cited

U.S. PATENT DOCUMENTS

| 5,490,792 A | * | 2/1996 | Sugita ........................ 439/159 |
| 5,499,163 A | * | 3/1996 | Sonntag et al. ............. 361/759 |
| 5,716,221 A | * | 2/1998 | Kantner ........................ 439/64 |
| 6,062,887 A | * | 5/2000 | Schuster et al. ............ 439/218 |
| 6,102,708 A | * | 8/2000 | Kimura ........................ 439/64 |
| 6,102,715 A | * | 8/2000 | Centofante ................... 439/140 |
| 6,162,089 A | * | 12/2000 | Costello et al. ........... 439/541.5 |
| 6,174,198 B1 | * | 1/2001 | Wu et al. ................. 439/541.5 |
| 6,183,292 B1 | * | 2/2001 | Chen et al. .............. 439/541.5 |
| 6,219,256 B1 | * | 4/2001 | Wu .............................. 361/801 |

* cited by examiner

*Primary Examiner*—P. Austin Bradley
*Assistant Examiner*—Edwin A. León
(74) *Attorney, Agent, or Firm*—Rosenberg, Klein & Lee

(57) ABSTRACT

A slot set of a palm held compute for receiving multiple function cards simultaneously comprises a personal digital card and an adapting seat. The personal digital assistant has a receiving groove thereon. A bottom of the receiving groove is installed with an electrically connecting terminal set. The adapting seat has a receptacle at a lower end thereof. The receptacle is communicated with the electrically connecting terminal set. A plurality of slots are installed on the adapting seat. The bottom of each slot is installed with a terminal seat communicated with the receptacle for being inserted by function cards of different or the same specification. Thereby, the palm held computer is suitable for function cards of different specifications. If function cards of different specifications are to be read, it is necessary to update cards or download data.

4 Claims, 7 Drawing Sheets

EXPANSION SLOT ADAPTER FOR A PALM HELD COMPUTER

FIELD OF THE INVENTION

The present invention relates to a slot set of a palm held compute for receiving multiple function cards simultaneously. Thereby, the palm held computer is suitable for function cards of different or identical specification.

BACKGROUND OF THE INVENTION

A palm held computer (personal digital assistant) is a microcomputer, wherein the user inputs from the function keys on the panel or by a pen to select data or instructions thereon so as to perform related instructions.

Referring to FIG. 1, in general, a palm held microcomputer 60 has a slot 65 at a back side thereof for being inserted by a function card 80, such as SM cards (smart media card), MD cards (mini disk card); SD cards (secure digital card) or CF card (compact flash card). The power of the function card 80 is from the inner circuit unit in the palm held microcomputer 60. The function card 80 has a control unit 70 therein. The control unit 70 is communicated with the circuit unit as the function card 80 and the palm held microcomputer 60 are combined as an integral body.

Since the palm held microcomputer 60 has only single one slot for using a single function. A plurality of function cards with different or the same specification can not be used at the same time. If function cards of different specifications are to be read, it is necessary to update cards or download data.

SUMMARY OF THE INVENTION

Accordingly, the primary object of the present invention is to provide a slot set of a palm held compute for receiving multiple function cards simultaneously, which comprises a personal digital assistant and an adapting seat. The personal digital assistant has a receiving groove thereon. A bottom of the receiving groove is installed with an electrically connecting terminal set. The adapting seat has a receptacle at a lower end thereof. The receptacle is communicated with the electrically connecting terminal set. A plurality of slots are installed on the adapting seat. The bottom of each slot is installed with a terminal seat communicated with the receptacle for being inserted by function cards of different or the same specification. If function cards of different specifications are to be read, it is necessary to update cards or download data.

Another object of the present invention is to provide a slot set of a palm held compute for receiving multiple function cards simultaneously. Thereby, the palm held computer is suitable for function cards of different or identical specification.

The various objects and advantages of the present invention will be more readily understood from the following detailed description when read in conjunction with the appended drawing.

DETAILED DESCRIPTION OF THE PREFERRED EMBODIMENTS

Figure 1:
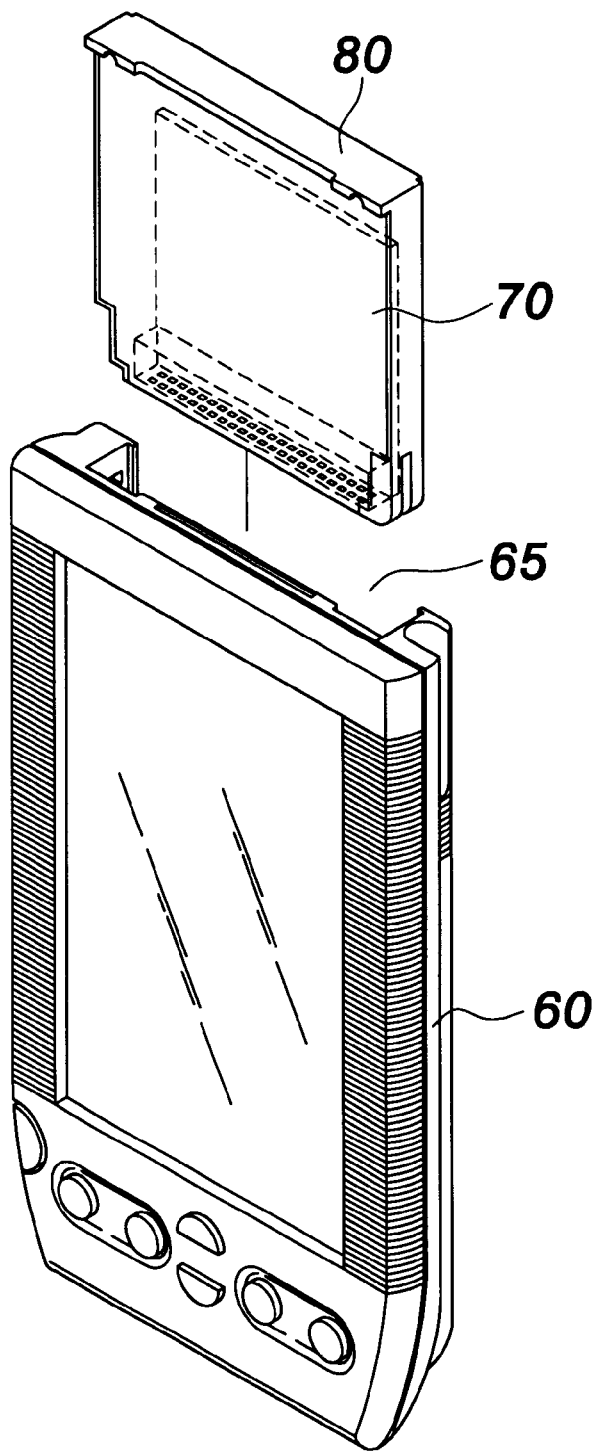
FIG. 1 is an exploded view of a prior art palm held microcomputer.
Figure 2:
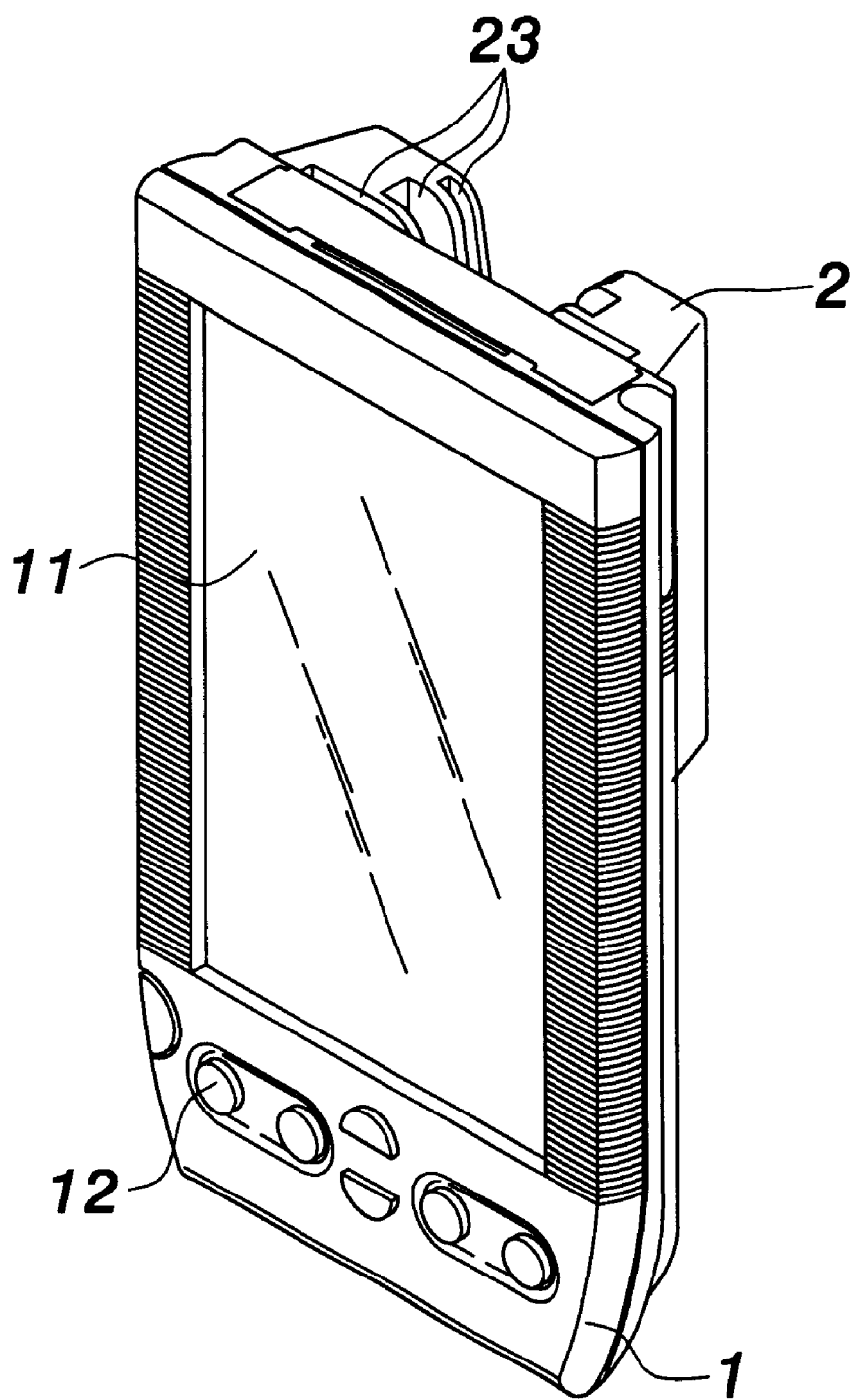
FIG. 2 is a perspective view of the palm held computer in the present invention.
Figure 3:
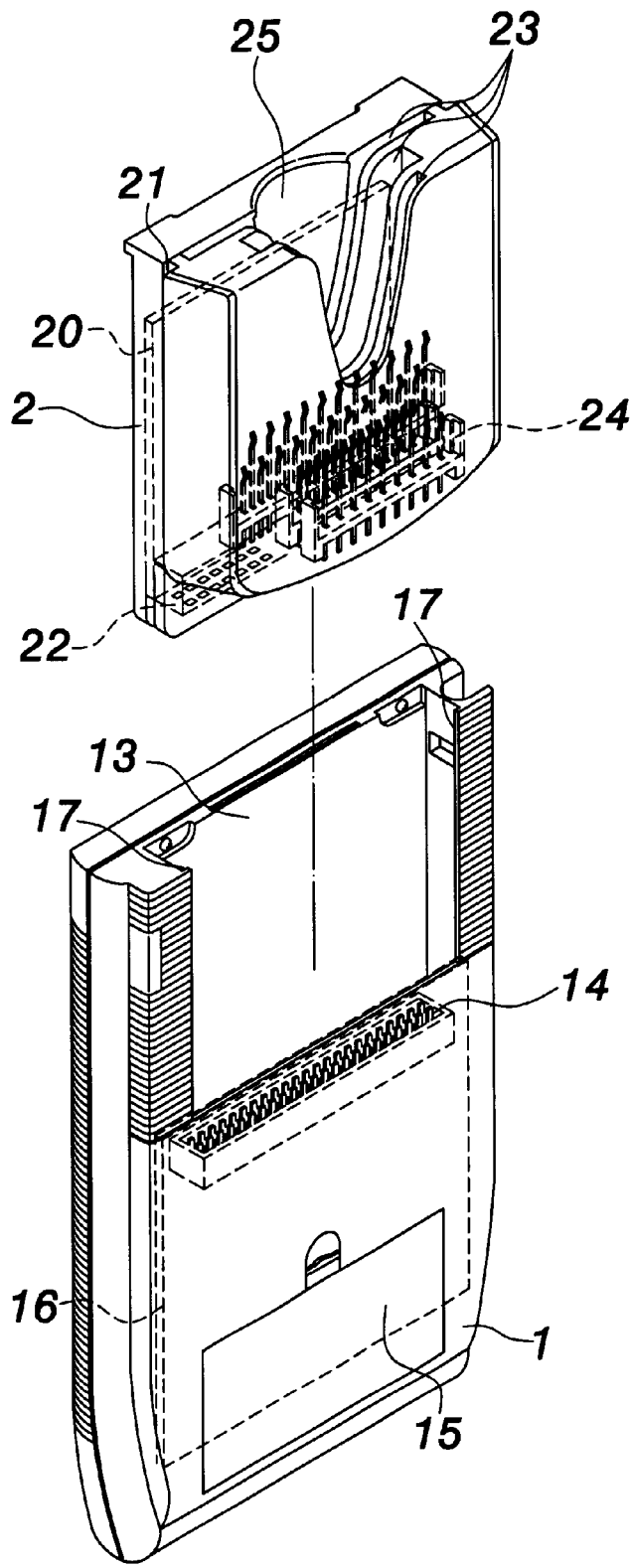
FIG. 3 is an exploded view of the palm held computer of the present invention.
Figure 4:
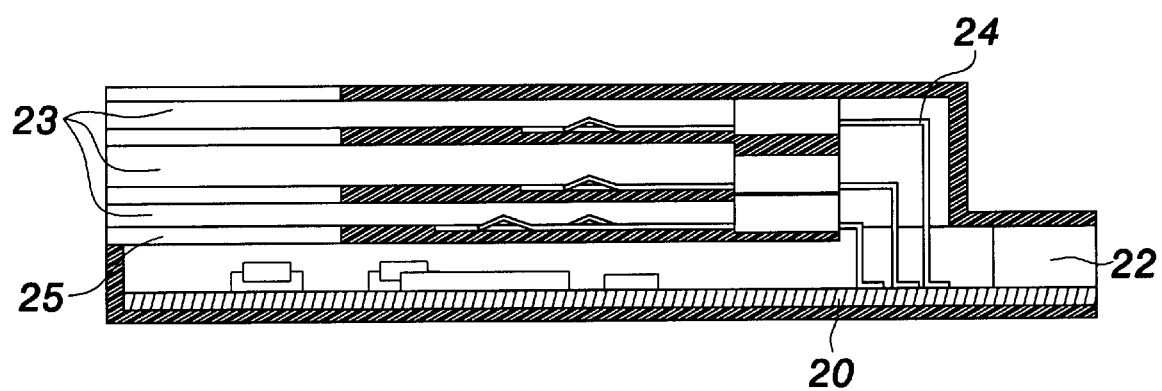
FIG. 4 is a cross sectional view of the adapting seat according to the present invention.

Referring to FIGS. 2 to 4, the slot set of a palm held computer according to the present invention is illustrated. The slot set of a palm held computer includes a machine body 1 of a personal digital assistant (PDA) and an adapting seat 2.

The machine body 1 is installed with a display plate. A window 11 and function keys 12 are installed on the plate. The inner circuit unit thereof has a function of storage. Thereby, the user may select desired numbers and icons on the window 11 using the function keys 12 so that the object of storage and recording is achieved. The back panel of the machine body 1 is installed with a receiving groove 13 for receiving the adapting seat 2. A bottom opposite to the receiving groove 13 is mounted with an electrically connecting terminal set 14. The sides of the receiving groove 13 each have a longitudinally extended protruding edge 17. The electrically connecting terminal set 14 is communicated with the circuit unit 16. A battery cover 15 is installed adjacent to the receiving groove 13. The battery cover 15 has batteries therein for supplying power to the circuit unit 16.

The two lateral surfaces of the adapting seat 2 are formed with respective sliding grooves 21 for respective sliding engagement with the protruding edges 17 of the receiving groove 13 of the machine body 1. A bottom of the adapting seat 2 is installed with a receptacle 22. The receptacle 22 is firmly secured to a circuit board 20. A plurality of adjacent slots are installed on the adapting seat 2. In the embodiment of the present invention, there are three slots. The bottom of each slot 23 is installed with a receptacle 22 communicated with the terminal seat 24 for being inserted by three functional cards (not shown), such as SM card, SD card, MD card, or CF card. A recess 25 is formed between two sliding grooves 21 of the adapting seat 2. Thereby, the user may push the adapting seat 2 into the receiving groove 13 of the machine body 1, or extract the adapting seat 2 from the machine body 1.

Thereby, the palm held computer can be suitable for the function cards without modification for function cards with different specifications.

Figure 5:
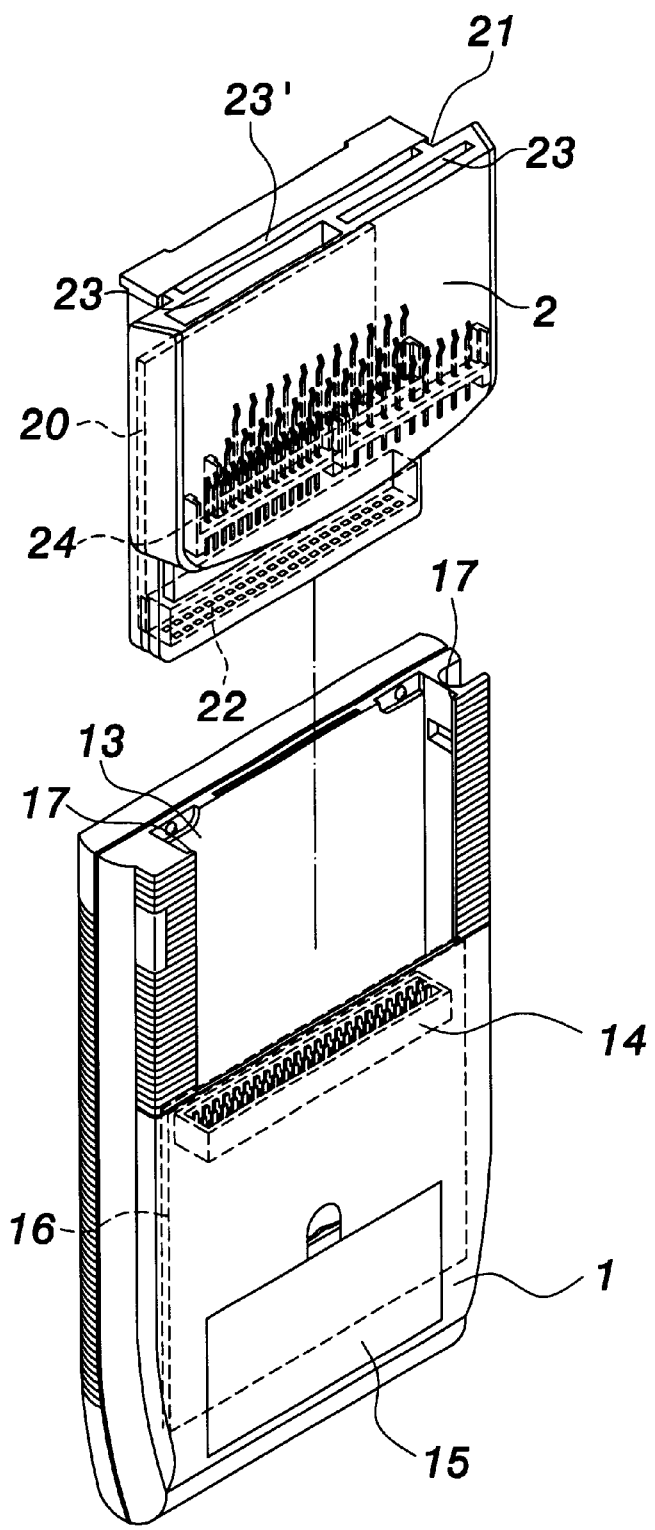
FIG. 5 is an exploded view of the second embodiment in the present invention.

Referring to FIG. 5, in the present invention, two slots 23, 23' can be formed on one lateral surface of the adapting seat 2.

Figure 6:
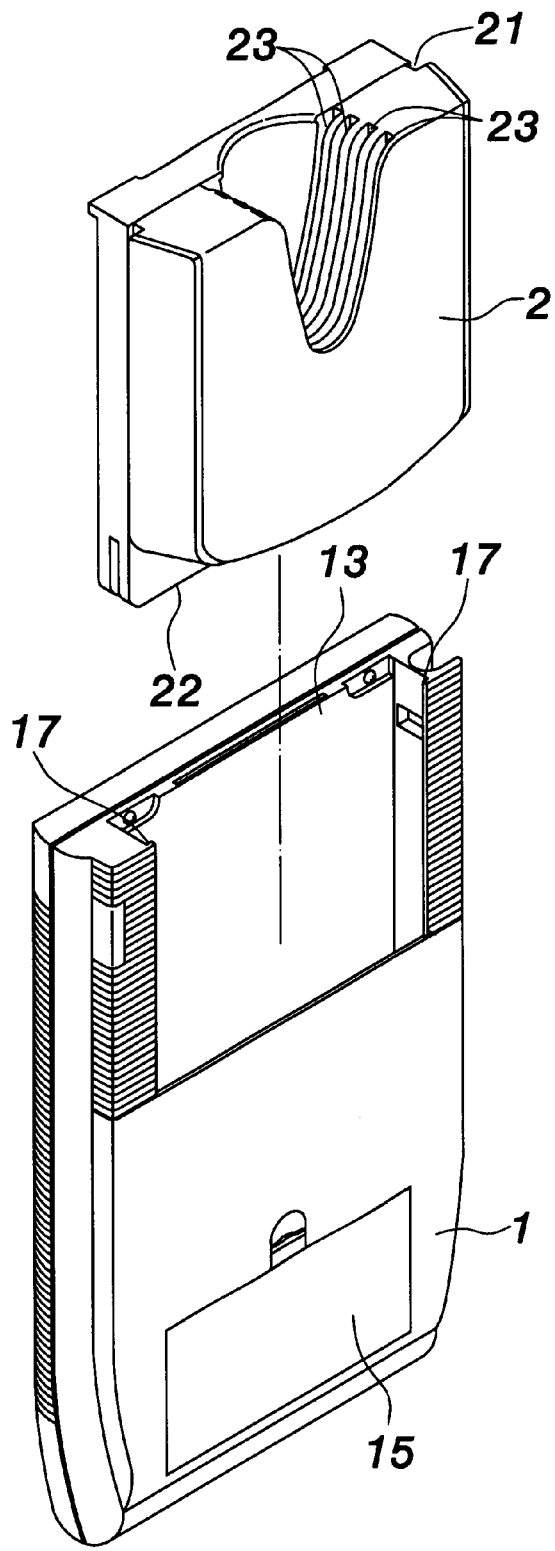
FIG. 6 is an exploded view of third embodiment in the present invention.

Referring to FIG. 6, in the present invention, four adjacent slots 23 can be formed on one lateral surface of the adapting seat 2.

Figure 7:
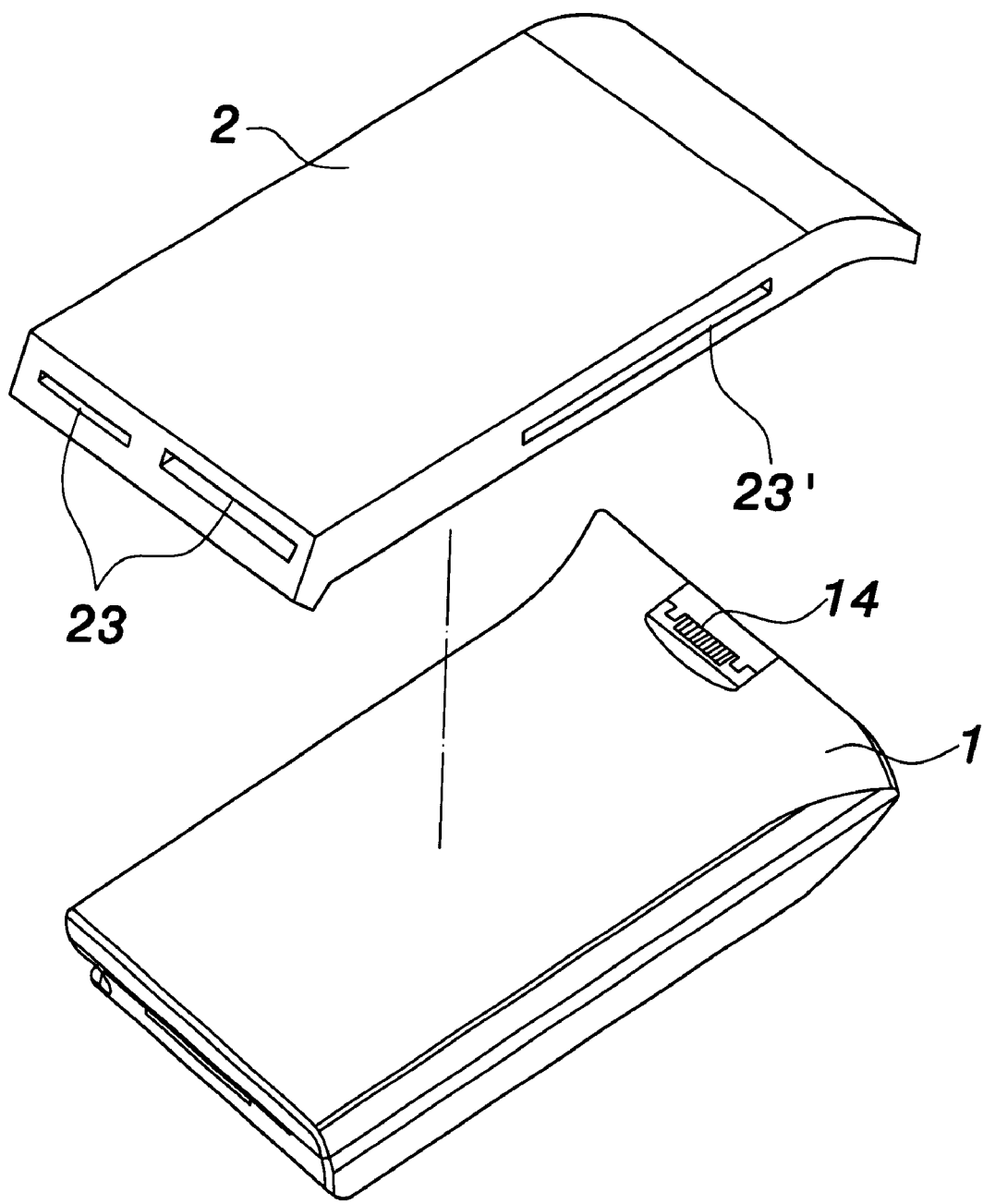
FIG. 7 is an exploded view of the fourth embodiment in the present invention.

Referring to FIG. 7, in the present invention, one lateral surface of the adapting seat 2 is formed with two slots 23 and at another adjacent surface is installed with another two slots 23.

Thereby, the user may insert the function card into the slots 23 (23') of the adapting seat 2 at the same time. Thereby, the machine body 1 may read data in the function card.

In summary, the present invention has the following advantage:

1. A plurality of cards can be used on the adapting seat.
2. It is unnecessary to update or download for function cards of different specifications.
3. The user may select as required.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An expansion slot adapter for a palm held computer for simultaneously receiving multiple function cards, comprising:

a personal digital assistant having a longitudinally extended receiving groove formed therein, said receiving groove having a pair of longitudinally extending protruding edges on opposing sides thereof, a bottom of the receiving groove being installed with an electrically connecting terminal set; and an adapting seat having a receptacle at a lower end thereof and being adapted for insertion into the receiving groove of the personal digital assistant, said adapting seat having a pair of longitudinally extended sliding grooves formed therein for respective sliding engagement with said protruding edges of said receiving groove, the receptacle being communicated with the electrically connecting terminal set responsive to said adapting seat being inserted into said receiving groove, said adapting seat having a plurality of slots formed therein, each slot having a portion installed with a terminal seat communicated with the receptacle for respectively receiving a plurality function cards.

2. The expansion slot adapter for a palm held computer for simultaneously receiving multiple function cards as claimed in claim 1, wherein said plurality of slots are formed on one longitudinally extended side surface of the adapting seat.

3. The expansion slot adapter for a palm held computer for simultaneously receiving multiple function cards as claimed in claim 1, wherein at least two of said plurality of slots are disposed in side-by-side relationship.

4. The expansion slot adapter for a palm held computer for simultaneously receiving multiple function cards as claimed in claim 1, wherein said adapting seat has a longitudinally extended recess disposed between said two sliding grooves, said recess being located adjacent said plurality of slots and extending in parallel therewith.

* * * * *